United States Patent
Ochiai et al.

(10) Patent No.: US 10,568,037 B2
(45) Date of Patent: Feb. 18, 2020

(54) ELECTRONIC APPARATUS AND SIGNAL RECEPTION CONTROL METHOD

(71) Applicant: CASIO COMPUTER CO., LTD., Shibuya-ku, Tokyo (JP)

(72) Inventors: Fumiaki Ochiai, Higashiyamato (JP); Yoshinori Asami, Fussa (JP); Yohei Kawaguchi, Akishima (JP); Katsuhiko Obata, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/278,153

(22) Filed: Feb. 17, 2019

(65) Prior Publication Data

US 2019/0281557 A1  Sep. 12, 2019

(30) Foreign Application Priority Data

Mar. 8, 2018 (JP) ................................ 2018-041897

(51) Int. Cl.
*H04B 1/06* (2006.01)
*H04W 52/02* (2009.01)

(52) U.S. Cl.
CPC .......... *H04W 52/0274* (2013.01); *H04B 1/06* (2013.01); *H04W 52/0225* (2013.01)

(58) Field of Classification Search
CPC ...... H04B 1/16; H04B 1/1607; H04B 1/3827; H04B 5/00; H04B 5/0031; H04B 5/0037; H04B 17/00; H04B 17/23; H04B 17/318; G04C 11/02; H04W 52/01; H04W 52/0209; H04W 52/0225; H04W 52/0251; H04W 52/0264; H04W 52/0274

See application file for complete search history.

(56) References Cited

U.S. PATENT DOCUMENTS

| | | | |
|---|---|---|---|
| 8,432,771 B2 | 4/2013 | Matsuzaki | |
| 8,897,097 B2* | 11/2014 | Baba | G01S 19/26 342/357.74 |
| 8,908,479 B2* | 12/2014 | Teng | G04G 19/00 368/204 |
| 9,739,868 B2* | 8/2017 | Baxley | G06F 16/285 |
| 9,787,366 B1* | 10/2017 | Shirani-Mehr | H02J 50/12 |
| 10,038,332 B1* | 7/2018 | Leabman | H02J 7/025 |
| 2014/0106677 A1* | 4/2014 | Altman | H04B 1/3827 455/41.2 |
| 2014/0241133 A1* | 8/2014 | Baba | G04C 10/02 368/47 |
| 2015/0311933 A1* | 10/2015 | Honda | G04R 20/04 455/140 |

(Continued)

FOREIGN PATENT DOCUMENTS

| | | | |
|---|---|---|---|
| CN | 100557527 C | * | 11/2009 |
| JP | 2011038988 A | | 2/2011 |

*Primary Examiner* — Blane J Jackson
(74) *Attorney, Agent, or Firm* — Holtz, Holtz & Volek PC (57) ABSTRACT

An electronic apparatus includes a first power feeder, a positioning-satellite-signal receiver, and a CPU. The first power feeder receives power from an external device and feeds the power to a secondary battery. The positioning-satellite-signal receiver receives a satellite signal transmitted by a positioning satellite. The CPU limits a receiving operation of the positioning-satellite-signal receiver when the first power feeder is receiving the power from the external device.

15 Claims, 6 Drawing Sheets

(56) References Cited

U.S. PATENT DOCUMENTS

| | | | |
|---|---|---|---|
| 2016/0134142 A1* | 5/2016 | Murphy | H02J 7/0054 |
| | | | 455/573 |
| 2016/0259304 A1* | 9/2016 | Fujisawa | G04R 20/02 |
| 2018/0316783 A1* | 11/2018 | Ye | G06F 1/1652 |

* cited by examiner

ELECTRONIC APPARATUS AND SIGNAL RECEPTION CONTROL METHOD

CROSS-REFERENCE TO RELATED APPLICATION

This application claims the benefit of Japanese Patent Application No. 2018-041897, filed on Mar. 8, 2018, the entire disclosure of which is incorporated by reference herein.

FIELD

This application relates generally to an electronic apparatus and a signal reception control method.

BACKGROUND

Electronic apparatuses that have a built-in Global Positioning System (GPS) receiver to measure an own position are becoming popular. Although the GPS receiver receives signals from the GPS satellites which go around the earth to measure the own position, in order to measure the position, signals received from at least equal to or greater than three GPS satellites are necessary. When the GPS receiver is located in an indoor site, the signals from the sufficient number of GPS satellites are not receivable, and thus the position measurement is difficult. Accordingly, since the GPS receiver is unable to measure the position even if executing a signal receiving operation for measuring the position, waste power is consumed. Hence, according to, for example, an electronic watch disclosed in Unexamined Japanese Patent Application Kokai Publication No. 2011-38988, the operation of a GPS receiver is controlled in accordance with the power generation amount by solar cells, thereby suppressing a waste signal receiving operation, and attempting a reduction of power consumption.

According to the electronic watch disclosed in the above Patent Literature, when the power generation amount by the solar cells is little, a determination is made such that such a clock is presently located in an indoor site, and the GPS receiver is controlled so as not to execute the signal receiving operation for measuring the position. In the night time, however, since the power generation amount is little even if such a clock is located in an outside site, the electronic watch mistakenly determines that such a clock is located in an indoor site, and an opportunity for receiving the GPS signal is missed although the position measurement is enabled in nature.

SUMMARY

An electronic apparatus and a signal reception control method are disclosed.

According to one aspect of the present disclosure, the electronic apparatus includes a first power feeder configured to receive power from an external device and feeds the power to a secondary battery, a positioning-satellite-signal receiver configured to receive a satellite signal transmitted by a positioning satellite; and a processor configured to limit a receiving operation of the positioning-satellite-signal receiver when the first power feeder is receiving the power from the external device.

BRIEF DESCRIPTION OF THE DRAWINGS

A more complete understanding of this application can be obtained when the following detailed description is considered in conjunction with the following drawings, in which.

DETAILED DESCRIPTION

Embodiments will be described below with reference to the figures. Note that the same reference numeral will be given to the same or similar component throughout the figures.

Embodiment 1

Figure 1:
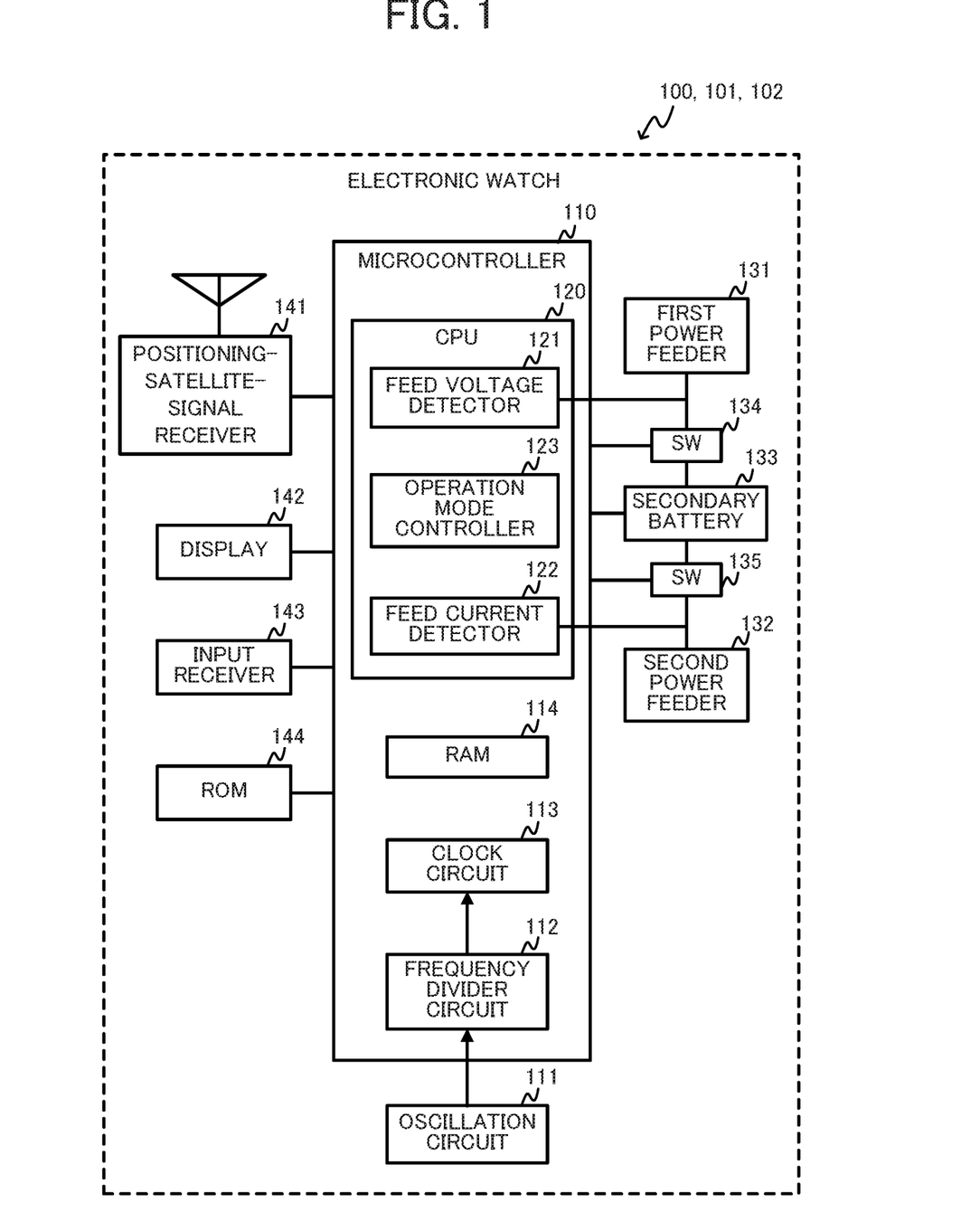
FIG. 1 is a diagram illustrating an example of a structure of an electronic watch according to Embodiment 1 of the present disclosure.

As illustrated in FIG. 1, an electronic watch 100 according to Embodiment 1 includes, as a hardware configuration, a microcontroller 110, an oscillation circuit 111, a first power feeder 131, a second power feeder 132, a secondary battery 133, a Switch (SW) 134 provided between the first power feeder 131 and the secondary battery 133, an SW 135 provided between the second power feeder 132 and the secondary battery 133, a positioning-satellite-signal receiver 141, a display 142, an input receiver 143, and a Read-Only Memory (ROM) 144.

The microcontroller 110 includes a frequency divider circuit 112, a clock circuit 113, a Random Access Memory (RAM) 114, and a Central Processing Unit (CPU) 120 as a processor. Note that the frequency divider circuit 112, the clock circuit 113 and the RAM 114 may be provided at, instead of the interior of the microcontroller 110, at the exterior of the microcontroller 110. Moreover, the oscillation circuit 111 and the ROM 144 may be provided at, instead of the exterior of the microcontroller 110, the interior of the microcontroller 110.

The oscillation circuit 111 oscillates an oscillator like a quartz oscillator, and generates and outputs a predetermined frequency signal (a clock signal).

The frequency divider circuit 112 divides the frequency signal input from the oscillation circuit 111 to a frequency signal to be utilized by the clock circuit 113 and by the CPU 120, and outputs the signal having undergone the frequency division. The frequency of the output signal by the frequency divider circuit 112 may be changed based on the setting by the CPU 120.

The clock circuit 113 counts the number of oscillations of the signal input from the frequency divider circuit 112, thereby calculating the present clock time. Note that the clock circuit 113 may be achieved by a software that changes a value stored in the RAM 114 for each predetermined cycle (for example, 1 second) or may be achieved by special-purpose hardware The clock time kept by the clock circuit 113 may be any of an accumulated time from a predetermined timing, a Coordinated Universal Time (UTC), a standard time of each site like a Japan Standard Time (JST), and a clock time (a local time) of a preset city. Moreover, the clock time kept by the clock circuit 113 may be in other formats than year, month, day, hour, minute, and second. Note that the oscillation circuit 111, the frequency divider circuit 112 and the clock circuit 113 form a clock in this embodiment.

The RAM 114 is a volatile memory, such as a Static Random Access Memory (SRAM) or a Dynamic Random Access Memory (DRAM). The RAM 114 stores temporal data, various setting data, image data to be displayed on the display 142, and the like, as a work memory. According to this embodiment, the image data represents, for example, a present clock time, a year, a month, a day, a day of week, the battery remaining level, and the like.

The CPU 120 is a processor that comprehensively controls the entire operation of the electronic watch 100. The CPU 120 reads a control program stored in the ROM 144, and executes various arithmetic controls, display control, and the like, relating to the various functions of the electronic watch 100 while utilizing the RAM 114 as a work memory.

The first power feeder 131 receives power from an external device, and feeds the power to the secondary battery 133. For example, the first power feeder 131 receives power from an external wireless charging device by electromagnetic induction, and feeds the power to the secondary battery 133. When the electronic watch 100 is connected (set) to an external device (for example, a wireless charging device), power is supplied from the external device, and the first power feeder 131 outputs a voltage that is a feed voltage VS (for example, 5 V). Next, the output voltage by the first power feeder 131 charges the secondary battery 133. Hence, when an output voltage V by the first power feeder 131 is compared with a reference voltage VR (a voltage between 0 V and VS, for example, 3 V), and when the output voltage V exceeds the reference voltage VR, the electronic watch 100 can determine as being connected (set) to the external device. Note that regarding the wireless charging device, the wireless charging scheme is not limited to electromagnetic induction. For example, a magnetic-field resonance scheme may be adopted. Moreover, the charging scheme relating to the first power feeder 131 is not limited to the wireless charging, and for example, power may be fed from the external device via a cable like Universal Serial Bus (USB) charging. Note that the first power feeder 131 functions as first power feeding means.

The second power feeder 132 includes solar cells, and feeds, to the secondary battery 133, power generated by the solar cells that are receiving light. The greater the intensity of lights received by the solar cells is, the larger the power (power feeding level) to be output by the second power feeder 132 becomes. In this case, when the solar cells receive solar light (the light that has a lighting intensity equal to or greater than 10000 lx), the second power feeder 132 outputs a current that exceeds a reference current CR (for example, 50 μA). Note that the second power feeder 132 functions as second power feeding means.

The secondary battery 133 is, for example, a lithium ion battery, and supplies the power to each component of the electronic watch 100. Moreover, the secondary battery 133 is charged by the power feeding from the first power feeder 131 or from the second power feeder 132.

The SW 134 and the SW 135 enable the control by the microcontroller 110 for connection and disconnection. The SW 134 permits or prohibits the first power feeder 131 to feed the power to the secondary battery 133. Moreover, the SW 135 permits or prohibits the second power feeder 132 to feed the power to the secondary battery 133. Those switches SW 134 and SW 135 change over the power feeding to charge the secondary battery 133 between from the first power feeder 131 and from the second power feeder 132, and prevent the secondary battery 133 from being overcharged.

The positioning-satellite-signal receiver 141 receives the satellite signals transmitted from the positioning satellites. The positioning-satellite-signal receiver 141 includes an antenna and a receiver circuit capable of receiving, for example, satellite signals within an L1 band (1.57542 GHz) of the GPS satellite that is the positioning satellite, and receives the satellite signals transmitted from the GPS satellite. Next, information contained in the received satellite signals is given to the microcontroller 110. Note that, although the information contained in the satellite signals is information basically for position measurement, this information also contains information on the present clock time. For example, in order to execute the position measurement in accordance with the satellite signal from the GPS satellite, the satellite signals received from at least equal to or greater than three GPS satellites are necessary, but the present clock time can be obtained by receiving the satellite signals from the single GPS satellite. Note that the positioning-satellite-signal receiver 141 functions as positioning-satellite-signal receiving means.

The display 142 displays data relating to the clock time and to various functions. In this embodiment, although the display 142 includes a liquid crystal panel that displays the clock time digitally, the present disclosure is not limited to this case. For example, the display 142 may include a second hand, a minute hand, an hour hand, and the like, and may display the analog clock time. Moreover, in addition to the second hand, the minute hand, the hour hand, and the like, the display 142 may also include the liquid crystal panel, indicate the analog clock time by the respective arms, and also display the data relating to the date and time and various functions.

The input receiver 143 receives an input operation given by a user, and outputs, to the microcontroller 110, an electric signal that is an input signal corresponding to the input operation. The input receiver 143 includes, for example, push button switches and a crown. Alternatively, the input receiver 143 that is a touch sensor may be provided so as to be laid over on the display screen of the display 142, and may form a touch panel together with the display screen. In this case, a touch sensor detects a touch position and a touch scheme relating to a touch operation by the user to the touch sensor, and outputs, to the microcontroller 110, an operation signal corresponding to the detected touch position and touch scheme.

The ROM 144 is, for example, a mask ROM or a non-volatile memory like a flash memory, and stores the control program and initial setting data. The control program stored in the ROM 144 contains programs relating to a positioning-satellite-signal reception control process to be described later.

Next, a functional configuration of the CPU 120 of the electronic watch 1 according to Embodiment 1 will be described. As illustrated in FIG. 1, the CPU 120 functions as a feed voltage detector 121, a feed current detector 122, and an operation mode controller 123. However, the feed voltage detector 121 and the feed current detector 122 may be achieved by the CPU 120 or by a peripheral device or a special-purpose Integrated Circuit (IC) other than the CPU 120. Moreover, those may be achieved by a combination of the peripheral device or the special-purpose IC with the CPU 120.

The CPU 120 as the feed voltage detector 121 detects the value of the voltage that is being output by the first power feeder 131. Whether or not the secondary battery 133 is charged by the power feeding from the first power feeder 131 can be changed over by the SW 134, and regardless of whether or not the secondary battery 133 being charged by the first power feeder 131, the feed voltage detector 121 detects the voltage that is being output by the first power feeder 131. Regarding this detection, the feed voltage detector 121 may detect a voltage at a power feeding line that interconnects the first power feeder 131 with the SW 134, or may receive a signal that indicates the presence or absence of the power feeding from the first power feeder 131. In the case in which the feed voltage detector 121 receives the signal that indicates the presence or absence of the power feeding from the first power feeder 131, when receiving the signal indicating the presence of the power feeding, the feed voltage detector 121 may regard that the voltage that exceeds the reference voltage VR is detected. The feed voltage detector 121 functions as feed voltage detecting means.

The CPU 120 as the feed current detector 122 detects the value of a current that flows into the secondary battery 133 from the second power feeder 132. However, whether or not the secondary battery 133 is charged by the power feeding from the second power feeder 132 can be changed over by the SW 135, when the SW 135 is OFF, the feed current detector 122 detects the value of the voltage output by the second power feeder 132, and when the voltage that is equal to or higher than a prescribed voltage (for example, 7 V) is detected, the current that is a prescribed current (for example, 100 µA) is regarded as being detected. In this case, the term "prescribed voltage" is the value of the voltage to be output when the solar cells of the second power feeder 132 are receiving solar light (the light that has a lighting intensity equal to or greater than 10000 lx). Moreover, the term "prescribed current" is the value of the current that flows from the second power feeder 132 to the secondary battery 133 when the SW 135 is ON and when the solar cells of the second power feeder 132 are receiving solar light (the light that has a lighting intensity equal to or greater than 10000 lx). The feed current detector 122 functions as feed current detecting means.

The CPU 120 as the operation mode controller 123 changes the mode (a receiving mode) for receiving the positioning satellite signal by the positioning-satellite-signal receiver 141 in accordance with the positioning-satellite-signal reception control process to be described later. Note that the receiving mode includes three modes that are a "receiving function OFF" in which the positioning-satellite-signal receiver 141 is not activated (no satellite signal is received), "clock time receive" in which the clock time information is obtained without a position measurement using the satellite signal received by the positioning-satellite-signal receiver 141 (the satellite signals from only the single positioning satellite are received), and "position measurement" in which a position measurement is executed using the satellite signals received by the positioning-satellite-signal receiver 141 (in the case of, for example, the position measurement based on the signals from the GPS satellites, the satellite signals from equal to or greater than three GPS satellites are received). The CPU 120 as the operation mode controller 123 functions as receiving-operation limiting means.

Figure 2:
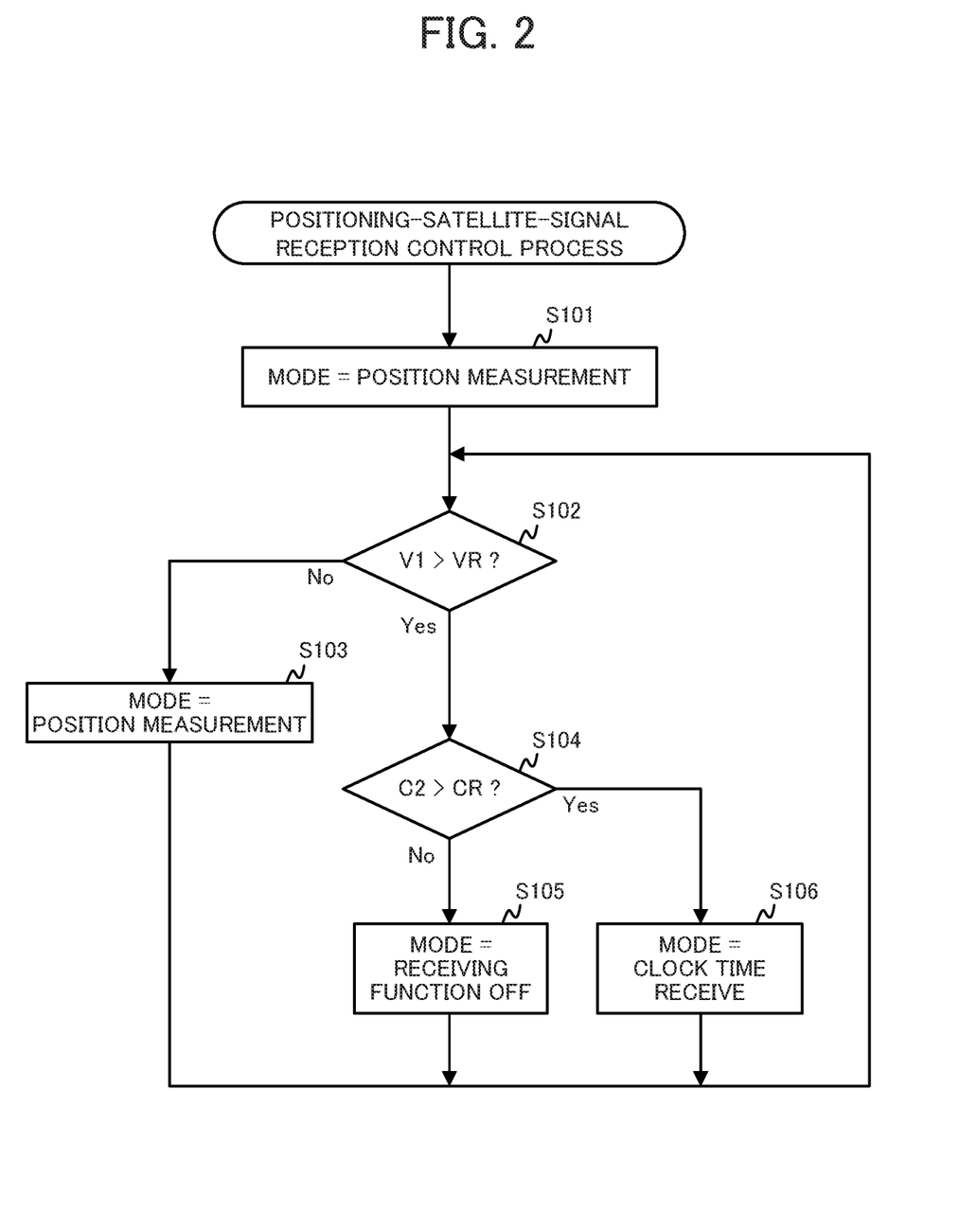
FIG. 2 is a flowchart of a positioning-satellite-signal reception control process according to Embodiment 1.

Next, the positioning-satellite-signal reception control process in which the CPU 120 changes the receiving mode will be described with reference to FIG. 2. When the electronic watch 100 is activated, the positioning-satellite-signal reception control process is launched as a thread, and the process starts in parallel with other threads. In this process, when the user of the electronic watch 100 comes home from the outdoor site, the electronic watch 100 is assumed to be set to the wireless charging device and the charging starts.

The CPU 120 as the operation mode controller 123 first sets the receiving mode to "position measurement" as an initialization process (step S101). This causes the positioning-satellite-signal receiver 141 to start the normal receiving operation. Note that, when the product specification of the electronic watch 100 is decided, for the purpose of reducing power consumption, and the like, the initial operation of the positioning-satellite-signal receiver 141 that deactivates the receiving operation is selected, the receiving mode of the operation mode controller 123 is set to "receiving function OFF" in the step S101.

Next, the CPU 120 determines whether or not the voltage V1 detected by the feed voltage detector 121 is higher than the reference voltage VR (step S102). The step S102 is also referred to as a determining step. When the detected voltage is lower than the reference voltage VR (step S102: NO), the operation mode controller 123 sets the receiving mode to "position measurement" (step S103). This is because when the voltage V1 is equal to or lower than the reference voltage VR, the electronic watch 100 is expected as not being set to the wireless charging device, and the user is expected as being in an outdoor site, and radio waves from equal to or greater than three GPS satellites are expected as being receivable. Next, the process returns to the step S102.

In contrast, when the voltage V1 detected by the feed voltage detector 121 is higher than the reference voltage VR (step S102: YES), the CPU 120 determines whether or not the current C2 detected by the feed current detector 122 is larger than the reference current CR (step S104). When the current C2 is equal to or lower than the reference current CR (step S104: NO), the operation mode controller 123 sets the receiving mode to "receiving function OFF" (step S105). This causes the positioning-satellite-signal receiver 141 to suspend the receiving operation. The step S105 is also referred to as a receiving-operation limiting step. This is because when the current C2 is equal to or lower than the reference current CR, the solar cells are expected as not receiving solar light, the electronic watch 100 is expected as being located in an indoor site apart from a window, and radio waves from the GPS satellite are expected as being hardly received. Next, the process returns to the step S102.

In contrast, when the current C2 detected by the feed current detector 122 is larger than the reference current CR (step S104: YES), the operation mode controller 123 sets the receiving mode to "clock time receive" (step S106). This causes the positioning-satellite-signal receiver 141 becomes the mode of receiving the satellite signal from the single GPS satellite, and obtaining the present clock time. This is because, in this case, the solar cells are receiving solar lights although the electronic watch 100 is set to the wireless charging device, the electronic watch 100 is expected as being located in an indoor site but being charged near the window, and radio waves from at least one GPS satellite are expected as being receivable. Next, the process returns to the step S102. As described above, even if the electronic watch 100 is located in an indoor site, the operation mode controller 123 limits the operation of the positioning-satellite-signal receiver 141 stepwise based on the power generation amount by the solar cells.

Through the above-described positioning-satellite-signal reception control process, when the electronic watch is expected in an outdoor site even in the night (when the wireless charging is not executed), the receiving mode is set to "position measurement", and the electronic watch 100 is capable of measuring the present position based on the signal received via the positioning-satellite-signal receiver 141. Moreover, when the electronic watch is expected as being located in an indoor site even if receiving solar light (when the wireless charging is executed), the receiving mode is set to "clock time receive", preventing the electronic watch 100 from executing a waste position measuring operation, and thus reduction of power consumption is achievable. Hence, the above-described positioning-satellite-signal reception control process further improves the precision of the positioning-satellite-signal reception control.

Embodiment 2

According to the positioning-satellite-signal reception control process (see FIG. 2) of the electronic watch 100 according to Embodiment 1, when the electronic watch 100 is located in an indoor site, since the position measurement is difficult, the receiving mode is changed to "receiving function OFF" or to "clock time receive" based on the power generation condition by the solar cells. However, receiving the satellite signal in the indoor site for simply obtaining the present clock time without a position measurement may be considerable as a power-wasting operation. Hence, Embodiment 2 that further simplifies the process of the positioning-satellite-signal reception control, and changes the receiving mode to "receiving function OFF" when the electronic watch is located in an indoor site and to "position measurement" in an outdoor site will be described.

The hardware configuration of an electronic watch 101 according to Embodiment 2 of the present disclosure is the same as that of the electronic watch 100 illustrated in FIG. 1. However, the electronic watch 101 may have no second power feeder 132. When having no second power feeder 132, the electronic watch 101 may also have no feed current detector 122 and SW 135.

Next, the positioning-satellite-signal reception control process in which the CPU 120 of the electronic watch 101 changes the receiving mode will be described with reference to FIG. 3. When the electronic watch 101 is activated, the positioning-satellite-signal reception control process is launched as a thread, and the process starts in parallel with other threads. In this process, when the user of the electronic watch 101 comes back from an outdoor site, the electronic watch 101 is assumed as being set to the wireless charging device.

Figure 3:
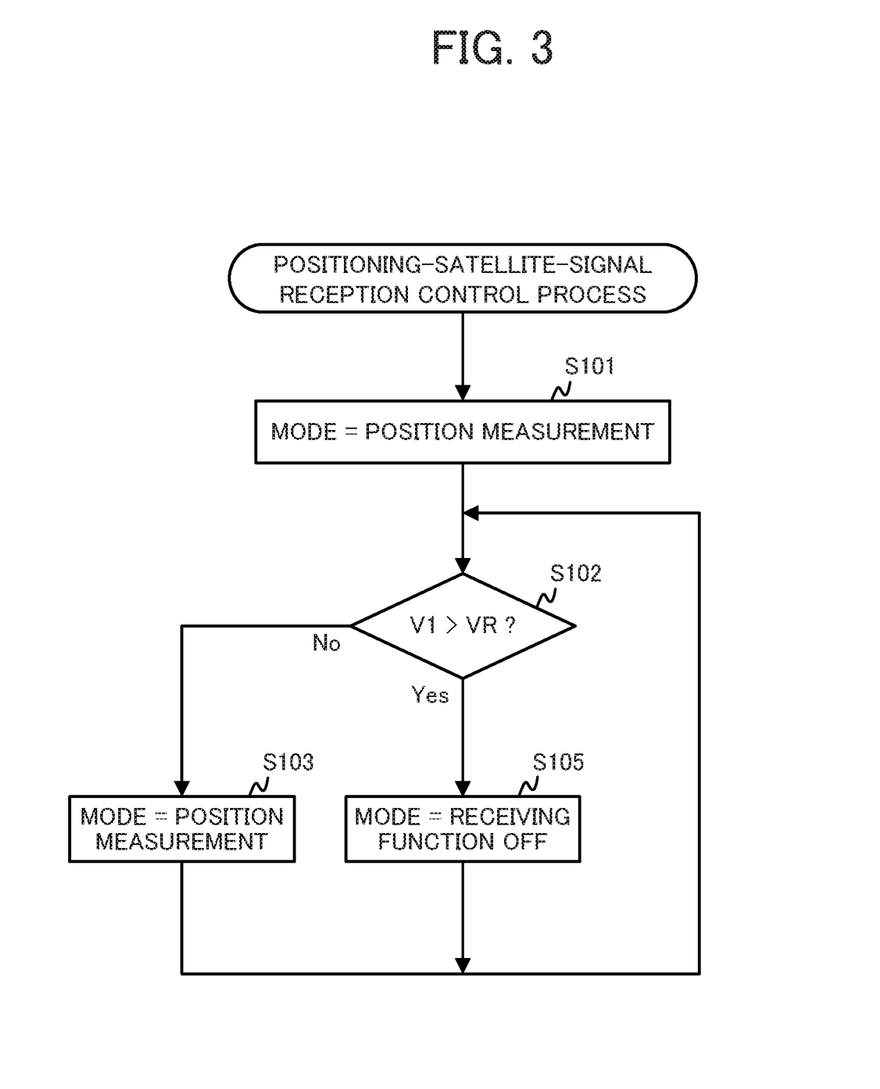
FIG. 3 is a flowchart of the positioning-satellite-signal reception control process according to Embodiment 2 of the present disclosure.

As illustrated in FIG. 3, the positioning-satellite-signal reception control process of the electronic watch 101 has the process details that has the step S104 and the step S106 eliminated from the positioning-satellite-signal reception control process (FIG. 2) of the electronic watch 100.

The process details in the steps S101, S103 and S105, the determination details in the step S102, and the progress to the step S103 when the determination in the step S102 is NO are the same as those of the positioning-satellite-signal reception control process (FIG. 2) of the electronic watch 100. According to the electronic watch 101, however, when the determination in the step S102 is YES, the process progresses to the step S105 without a determination in the step S104.

Through the above-described positioning-satellite-signal reception control process, when the electronic watch 101 is expected as being located in an outdoor site (when the wireless charging is not executed), the receiving mode becomes "position measurement", and the electronic watch 101 measures the present position based on the signal received by the positioning-satellite-signal receiver 141. Moreover, when the electronic watch is expected as being located in an indoor site (when the wireless charging is executed), the receiving mode becomes "receiving function OFF", allowing the electronic watch 101 to avoid a power-wasting signal receiving process from the positioning satellite under the circumstance in which the position measurement is unavailable. Hence, according to the electronic watch 101, when the user is located in an outdoor site, even if in a situation such that the power generation amount by the solar cells is little because the present situation is in the night or the solar cells are hidden by a sleeve, and the like, the receiving mode becomes "position measurement" by the positioning-satellite-signal reception control process. Moreover, according to the electronic watch 101, when the user is located in an indoor site, even if in a situation such that lighting is quite bright and solar light is receivable near a window, and the like, the receiving mode becomes "receiving function OFF" by the positioning-satellite-signal reception control process. As described above, the electronic watch 101 is capable of further improving the precision of the positioning-satellite-signal reception control by the above-described positioning-satellite-signal reception control process when the user is located in the outdoor site or when in the indoor site.

Embodiment 3

According to the positioning-satellite-signal reception control process (see FIG. 3) of the electronic watch 101 according to Embodiment 2, when the voltage V1 detected by the feed voltage detector 121 is higher than the reference voltage VR, a determination is made such that the user is in an indoor site and the receiving mode is set to "receive function OFF." When, however, the user connects a mobile battery to the electronic watch and charging the electronic watch in an outdoor site, even if the user is located in the outdoor site, the voltage V1 detected by the feed voltage detector 121 may become higher than the reference voltage VR. Accordingly, Embodiment 3 that enables the user to select ON and OFF state of the receiving function of the positioning satellite signal when the voltage V1 is higher than the reference voltage VR will be described.

The hardware configuration of an electronic watch 102 according to Embodiment 3 of the present disclosure is the same as those of the electronic watches 100 and 101 as illustrated in FIG. 1. According to the electronic watch 102, however, the user can select the ON and OFF state of the receiving function of the positioning satellite signal in accordance with an input from the input receiver 143. Next, the ON and OFF state of the receiving function of the positioning satellite signal selected by the user is stored in the flash memory of the ROM 144 as the value of a variable SEL_RCV. When the user selects the ON and OFF state of the receiving function of the positioning satellite signal, the input receiver 143 functions as a signal-receive limiting selector. Moreover, the electronic watch 102 may have no second power feeder 132 like the electronic watch 101. The electronic watch 102 does not need to have the feed current detector 122 and the SW 135 when having no second power feeder 132.

Next, the positioning-satellite-signal reception control process in which the CPU 120 of the electronic watch 102 changes the receiving mode will be described with reference to FIG. 4. When the electronic watch 102 is activated, the positioning-satellite-signal reception control process is launched as a thread, and the process starts in parallel with other threads. Moreover, the ON and OFF state of the receiving function of the positioning satellite signal selected by the user is stored in the variable SEL_RCV on the flash memory.

Figure 4:
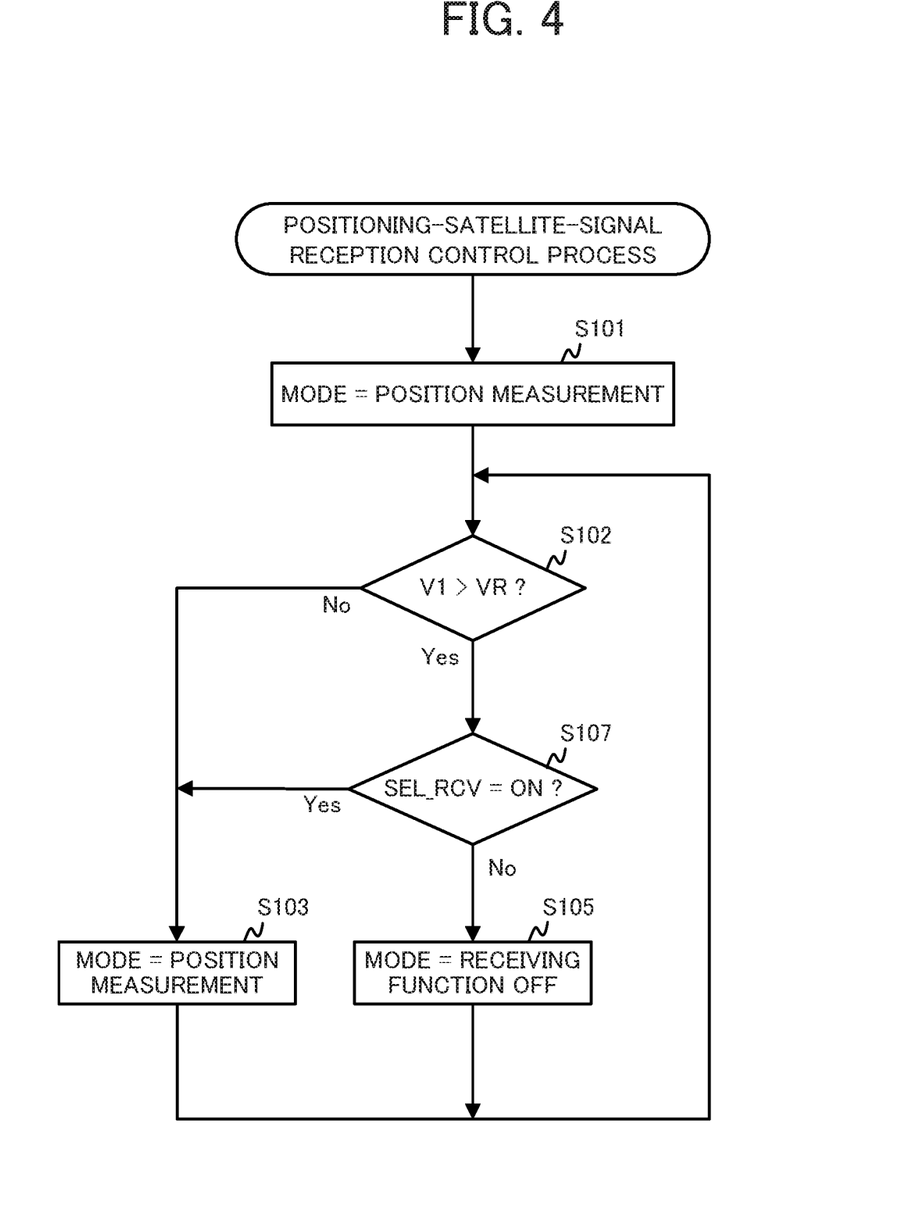
FIG. 4 is a flowchart of the positioning-satellite-signal reception control process according to Embodiment 3 of the present disclosure.

As illustrated in FIG. 4, the positioning-satellite-signal reception control process of the electronic watch 102 has the process details in which step S107 is added to the positioning-satellite-signal reception control process (FIG. 3) of the electronic watch 101.

The process details in the step S101, S103 and S105, the determination details in the step S102, and the progress to the step S103 when the determination in the step S102 is NO are the same as those of the positioning-satellite-signal reception control process (FIG. 3) of the electronic watch 101. According to the electronic watch 102, however, when a determination on the step S102 is YES, the process progresses to step S107.

The CPU 120 determines, in the step S107, whether or not the value of the variable SEL_RCV set by the user indicates ON. When the value of SEL_RCV indicates ON (step S107: YES), the process progresses to the step S103, and the operation mode controller 123 sets the receiving mode to "position measurement". Moreover, when the value of SEL_RCV indicates OFF (step S107: NO), the process progresses to the step S105, and the operation mode controller 123 sets the receiving mode to "receiving function OFF."

Through the above-described positioning-satellite-signal reception control process, according to the electronic watch 102, when the power is fed to the secondary battery 133 from the first power feeder 131, the receiving mode is not always set to "receiving function OFF", but the receiving mode may be set to "position measurement" in accordance with the user's selection. When, for example, the user charges the electronic watch 102 using a mobile battery in an outdoor site, the power is fed to the secondary battery 133 from the first power feeder 131 by the mobile battery, but in such a case, when the user selects the ON state of the receiving function of the positioning satellite signal using the input receiver 143, the value of SEL_RCV becomes the value indicating ON, and the receiving mode becomes "position measurement", and thus the GPS signal receiving operation for position measurement is executed.

Note that in the above-described embodiment, although the value of the variable SEL_RCV is changed based on the user operation using the input receiver 143, the present disclosure is not limited to this case. For example, the first power feeder 131 may communicate to an external charging device, and the type of the external charging device may be notified to the CPU 120. Next, the CPU 120 changes the value of the variable SEL_RCV to the value indicating OFF when the type of the external charging device is a wireless charging device, and when the type of the external charging device is a mobile battery, the value of the variable SEL_RCV may be changed to the value indicating ON. When receiving the notification of the type of the charging device from the external charging device, the CPU 120 functions as the signal-receive limiting selector.

Through the above-described positioning-satellite-signal reception control process, when the electronic watch 102 is being charged by the external charging device, the receiving mode is not always fixed to "receiving function OFF", and the receiving mode can be changed to "position measurement" in accordance with the user's selection or the notification from the external device. This prevents the electronic watch 102 from missing an opportunity to receive the positioning satellite signal when the user is located in an outdoor site, and thus the precision of the positioning-satellite-signal reception control is further improved.

Embodiment 4

In the above-described embodiment, a case in which the user sets the electronic watch to the wireless charging device and charges the electronic watch after the user comes home is assumed. However, there is a possibility such that the user forgets setting the electronic watch to the wireless charging device after coming home, and leaves the electronic watch on a table, and the like. Embodiment 4 that can cope with such a case will be described.

Figure 5:
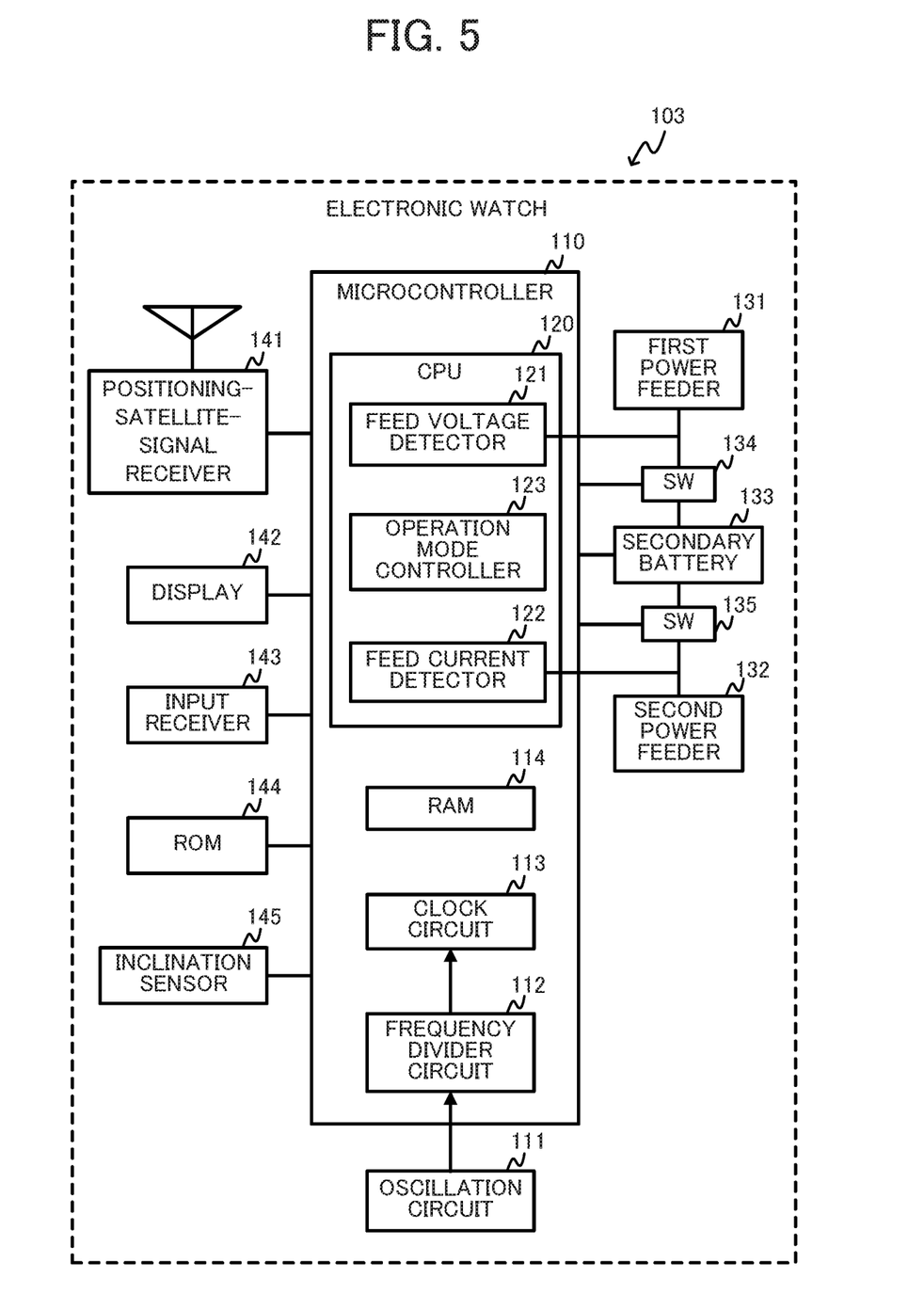
FIG. 5 is a diagram illustrating an example of a structure of an electronic watch according to Embodiment 4 of the present disclosure.

As illustrated in FIG. 5, an electronic watch 103 according to Embodiment 4 of the present disclose employs a structure in which an inclination sensor 145 is added to the electronic watch 100 according to Embodiment 1.

The inclination sensor 145 detects an inclination of the electronic watch 103. Based on the record indicating the value of the inclination detected by the inclination sensor 145, the CPU 120 determines that the electronic watch 103 is motionless when the value indicating the inclination remains unchanged, and determines that the electronic watch 103 is not motionless (is moving) when the value indicating the inclination changes. Note that the inclination sensor 145 is an example of a motionlessness determiner that determines whether or not the electronic watch 103 is motionless, and the electronic watch 103 may include an acceleration sensor, a gyro sensor, or the like as the motionlessness determiner instead of the inclination sensor 145. The motionlessness determiner (the inclination sensor 145, an acceleration sensor, a gyro sensor, or the like) that determines whether or not the electronic watch 103 is motionless function as motionlessness determining means.

Next, the positioning-satellite-signal reception control process in which the CPU 120 of the electronic watch 103 changes the receiving mode will be described with reference to FIG. 6. When the electronic watch 103 is activated, the positioning-satellite-signal reception control process is launched as a thread, and the process starts in parallel with other threads.

Figure 6:
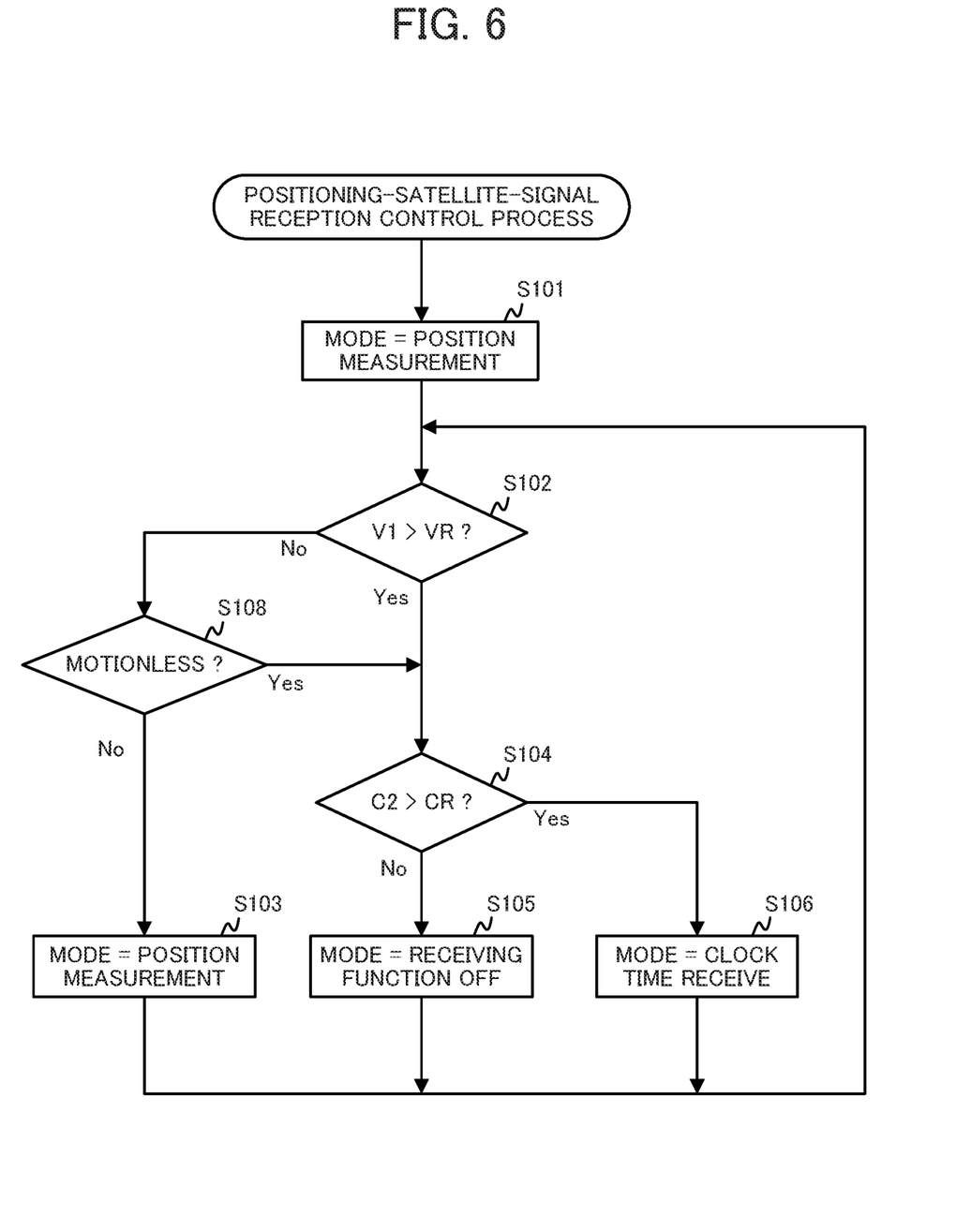
FIG. 6 is a flowchart of the positioning-satellite-signal reception control process according to Embodiment 4.

As illustrated in FIG. 6, the positioning-satellite-signal reception control process of the electronic watch 102 has the process details in which step S108 is added to the positioning-satellite-signal reception control process (FIG. 2) of the electronic watch 100.

The process details in the steps S101, S103, S104, S105 and S106, the determination details in the step S102, and the progress to the step S104 when the determination in the step S102 is YES are the same as those of the positioning-satellite-signal reception control process (FIG. 2) of the electronic watch 100. According to the electronic watch 103, however, when the determination in the step S102 is NO, the process progresses to step S108.

The CPU 120 determines, in the step S108, whether or not the electronic watch 103 is motionless based on the record of the value detected by the inclination sensor 145 up to the present moment. When the electronic watch 103 is motionless (step S108: YES), the CPU 120 determines that the user leaves the electronic watch 103 on a table, or the like, and progresses the process to the step S104. When the electronic watch 103 is not motionless (step S108: NO), the CPU 120 determines that the user is wearing the electronic watch 103 on an arm, and progresses the process to the step S103.

Through the above-described positioning-satellite-signal reception control process, even if the user forgets setting the electronic watch 103 to the wireless charging device after the user comes home and leaves the electronic watch on the table, or the like, the electronic watch 103 determines as being located in an indoor site, and avoids a power-wasting receiving operation of the positioning satellite signal under the circumstance in which the position measurement is unavailable. This enables the electronic watch 103 to further improve the precision of the positioning-satellite-signal reception control.

Note that the present disclosure is not limited to the above-described embodiments, and various combinations and modifications can be made.

For example, although the electronic watch has been described as an example of the electronic apparatus that includes a built-in positioning-satellite-signal receiver in the above-described embodiments, the present disclosure is not limited to the electronic watch, and is applicable to a smart watch, a smart phone, a portable navigation system, and the like, that includes a built-in positioning-satellite-signal receiver.

Moreover, in the above-described embodiments, although the positioning-satellite-signal receiver 141 has been described as receiving satellite signals of the GPS satellites as positioning satellites, the present disclosure is not limited to this case. For example, the positioning-satellite-signal receiver 141 may include an antenna and a receiver circuit capable of receiving satellite signals within an L1 band (substantially 1.6 GHz) of a Global Navigation Satellite System (GLONASS) satellite, and receive the satellite signal transmitted from the GLONASS satellite. Furthermore, the positioning-satellite-signal receiver 141 may include an antenna and a receiver circuit capable of receiving a satellite signal transmitted from a satellite operated in other satellite positioning systems, such as HOKUTO 2 (compass), Galileo, and the like. Still further, the positioning-satellite-signal receiver 141 may be capable of receiving satellite signals from different satellite positioning systems (for example, GPS and GLONASS). Since any satellite positioning systems commonly need to receive the satellite signals from a plurality of satellites for position measurement and to receive merely single satellite signal for obtaining the present clock time, each of the above-described embodiments is compatible with various satellite positioning systems in addition to GPS.

Moreover, for example, Embodiment 4 may be combined with above-described Embodiment or Embodiment 3. This enables even an electronic watch that does not have the second power feeder 132 to determine whether or not the electronic watch is motionless by the inclination sensor 145, determine that the electronic watch is in an indoor site when no power is fed from the first power feeder 131 and when the electronic watch is motionless, thereby avoiding a waste receiving operation of the positioning satellite signal under the circumstance in which the position measurement is unavailable.

Furthermore, in the above-described embodiments, the ROM 144 that includes a non-volatile memory like a flash memory has been described as an example of a computer-readable non-transitory medium that stores therein the control program relating to the positioning-satellite-signal reception control process according to the present disclosure. However, the computer-readable non-transitory medium is not limited to this type, and a portable non-transitory recording medium, such as a Hard Disk Drive (HDD), a Compact Disc Read Only Memory (CD-ROM), or a Digital Versatile Disc (DVD), may be adopted. Moreover, carrier waves (carriers) are also applicable as a non-transitory medium that provides data on the program relating to the present disclosure via a communication line.

Still further, specific details of the structure, the control procedure, the display example, and the like, described in the above-described embodiments can be modified as appropriate without departing from the scope and spirit of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An electronic apparatus comprising:
   a first power feeder configured to receive power from an external device and feed the power to a secondary battery;
   a positioning-satellite-signal receiver configured to receive a satellite signal transmitted by a positioning satellite; and
   a processor configured to limit a receiving operation of the positioning-satellite-signal receiver when the first power feeder is receiving the power from the external device and a feed voltage from the first power feeder exceeds a reference voltage.

2. The electronic apparatus according to claim 1, wherein the processor is configured to limit the receiving operation of the positioning-satellite-signal receiver when receiving a notification that the secondary battery is receiving the power fed from the external device.

3. The electronic apparatus according to claim 2, further comprising:
   a second power feeder configured to feed, to the secondary battery, power generated by solar cells,
   wherein the processor is configured to limit the receiving operation of the positioning-satellite-signal receiver stepwise based on a power feeding level from the second power feeder.

4. The electronic apparatus according to claim 3, wherein the positioning-satellite-signal receiver receives clock time information contained in the satellite signal when a feed current from the second power feeder exceeds a reference current, and the positioning-satellite-signal receiver suspends the receiving operation of the satellite signal when the feed current from the second power feeder is equal to or lower than the reference current.

5. The electronic apparatus according to claim 2, further comprising:
   a signal-receive limiting selector configured to select whether or not to limit the receiving operation of the positioning-satellite-signal receiver when the first power feeder is receiving the power from the external device,
   wherein in a case where not limiting the receiving operation of the positioning-satellite-signal receiver is selected by the signal-receive limiting selector, the processor is configured not to limit the receiving operation of the positioning-satellite-signal receiver even when the first power feeder is receiving the power from the external device.

6. The electronic apparatus according to claim 1, further comprising:
a second power feeder configured to feed, to the secondary battery, power generated by solar cells,
wherein the processor is configured to limit the receiving operation of the positioning-satellite-signal receiver stepwise based on a power feeding level from the second power feeder.

7. The electronic apparatus according to claim 6, wherein the positioning-satellite-signal receiver receives clock time information contained in the satellite signal when a feed current from the second power feeder exceeds a reference current, and the positioning-satellite-signal receiver suspends the receiving operation of the satellite signal when the feed current from the second power feeder is equal to or lower than the reference current.

8. The electronic apparatus according to claim 1, further comprising:
a signal-receive limiting selector configured to select whether or not to limit the receiving operation of the positioning-satellite-signal receiver when the first power feeder is receiving the power from the external device,
wherein in a case where not limiting the receiving operation of the positioning-satellite-signal receiver is selected by the signal-receive limiting selector, the processor is configured not to limit the receiving operation of the positioning-satellite-signal receiver even when the first power feeder is receiving the power from the external device.

9. An electronic apparatus comprising:
a first power feeder configured to receive power from an external device and feed the power to a secondary battery;
a positioning-satellite-signal receiver configured to receive a satellite signal transmitted by a positioning satellite;
a processor configured to limit a receiving operation of the positioning-satellite-signal receiver when the first power feeder is receiving the power from the external device; and
a second power feeder configured to feed, to the secondary battery, power generated by solar cells,
wherein the processor is configured to limit the receiving operation of the positioning-satellite-signal receiver stepwise based on a power feeding level from the second power feeder.

10. The electronic apparatus according to claim 9, wherein the positioning-satellite-signal receiver receives clock time information contained in the satellite signal when a feed current from the second power feeder exceeds a reference current, and the positioning-satellite-signal receiver suspends the receiving operation of the satellite signal when the feed current from the second power feeder is equal to or lower than the reference current.

11. The electronic apparatus according to claim 9, further comprising:
a signal-receive limiting selector configured to select whether or not to limit the receiving operation of the positioning-satellite-signal receiver when the first power feeder is receiving the power from the external device,
wherein in a case where not limiting the receiving operation of the positioning-satellite-signal receiver is selected by the signal-receive limiting selector, the processor is configured not to limit the receiving operation of the positioning-satellite-signal receiver even when the first power feeder is receiving the power from the external device.

12. An electronic apparatus comprising:
a first power feeder configured to receive power from an external device and feed the power to a secondary battery;
a positioning-satellite-signal receiver configured to receive a satellite signal transmitted by a positioning satellite;
a processor configured to limit a receiving operation of the positioning-satellite-signal receiver when the first power feeder is receiving the power from the external device; and
a motionlessness determiner configured to determine whether or not the electronic apparatus is motionless,
wherein in a case where the motionlessness determiner determines that the electronic apparatus is motionless, the processor is configured to limit the receiving operation of the positioning-satellite-signal receiver even when the first power feeder is not receiving the power from the external device.

13. A signal reception control method executed by an electronic apparatus including: (i) a first power feeder that receives power from an external device and feeds the power to a secondary battery and (ii) a positioning-satellite-signal receiver that receives a satellite signal transmitted by a positioning satellite, the method comprising:
determining whether or not the first power feeder is receiving the power from the external device; and
limiting a receiving operation of the positioning-satellite-signal receiver when a determination is made that the first power feeder is receiving the power from the external device and a feed voltage from the first power feeder exceeds a reference voltage.

14. A signal reception control method executed by an electronic apparatus including: (i) a first power feeder that receives power from an external device and feeds the power to a secondary battery, (ii) a positioning-satellite-signal receiver that receives a satellite signal transmitted by a positioning satellite, and (iii) a second power feeder configured to feed, to the secondary battery, power generated by solar cells, the method comprising:
determining whether or not the first power feeder is receiving the power from the external device; and
limiting a receiving operation of the positioning-satellite-signal receiver when a determination is made that the first power feeder is receiving the power from the external device,
wherein the receiving operation of the positioning-satellite-signal receiver is limited stepwise based on a power feeding level from the second power feeder.

15. A signal reception control method executed by an electronic apparatus including: (i) a first power feeder that receives power from an external device and feeds the power to a secondary battery, (ii) a positioning-satellite-signal receiver that receives a satellite signal transmitted by a positioning satellite, and (iii) a motionlessness determiner configured to determine whether or not the electronic apparatus is motionless, the method comprising:
determining whether or not the first power feeder is receiving the power from the external device; and limiting a receiving operation of the positioning-satellite-signal receiver when a determination is made that the first power feeder is receiving the power from the external device, wherein in a case where it is determined that the electronic apparatus is motionless, the receiving operation of the positioning-satellite-signal receiver is limited even when the first power feeder is not receiving the power from the external device.

\* \* \* \* \*